United States Patent
Negi et al.

(10) Patent No.: US 12,340,613 B2
(45) Date of Patent: Jun. 24, 2025

(54) FRAMEWORK FOR IDENTIFYING DOCUMENTS

(71) Applicant: ORACLE FINANCIAL SERVICES SOFTWARE LIMITED, Mumbai (IN)

(72) Inventors: Shubham Negi, Bilaspur (IN); Krishna Sameera Ellendula, Sangareddy (IN); Rahul Yadav, Alwar (IN); Veresh Jain, Bengaluru (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 411 days.

(21) Appl. No.: 17/887,609

(22) Filed: Aug. 15, 2022

(65) Prior Publication Data
US 2024/0054803 A1    Feb. 15, 2024

(51) Int. Cl.
| | |
|---|---|
| *G06V 30/42* | (2022.01) |
| *G06V 10/44* | (2022.01) |
| *G06V 10/74* | (2022.01) |
| *G06V 10/82* | (2022.01) |

(52) U.S. Cl.
CPC .............. *G06V 30/42* (2022.01); *G06V 10/44* (2022.01); *G06V 10/761* (2022.01); *G06V 10/82* (2022.01)

(58) Field of Classification Search
CPC ...... G06V 30/42; G06V 10/761; G06V 10/82; G06V 10/44
See application file for complete search history.

(56) References Cited

U.S. PATENT DOCUMENTS

| | | | |
|---|---|---|---|
| 10,467,526 | B1 | 11/2019 | Appalaraju et al. |
| 11,176,188 | B2 | 11/2021 | Yerebakan et al. |
| 2021/0295103 | A1* | 9/2021 | Tanniru ............... G06V 10/7747 |
| 2022/0335256 | A1* | 10/2022 | Saraee ................... G06F 18/22 |

OTHER PUBLICATIONS

Altexsoft, Document Classification With Machine Learning: Computer Vision, OCR, NLP, and Other Techniques; Nov. 17, 2021; p. 1-13.
Altexsoft, Intelligent Document Processing: Technology Overview; May 27, 2021; p. 1-12.

* cited by examiner

*Primary Examiner* — Quang N Vo
(74) *Attorney, Agent, or Firm* — Kraguljac Law Group LLC

(57) ABSTRACT

Systems, methods, and other embodiments associated with identifying a document type of an unidentified document based on image features are described. In one embodiment, image pairs are formed by pairing the unidentified document with anchor images from a plurality of anchor images, wherein each anchor image is a known document type. For each image pair, first visual features are extracted from the unidentified document and second visual features are extracted from the paired anchor image. A similarity function is applied to compare the first visual features and the second visual features, and a similarity score is generated for each image pair based on the comparing. The most similar anchor image from the image pairs, which has a greatest similarity score, is identified. The document type of the unidentified document is then predicted as the known document type associated with the most similar anchor image.

20 Claims, 5 Drawing Sheets

FRAMEWORK FOR IDENTIFYING DOCUMENTS

BACKGROUND

Identification documents are typically used to identify a person. There are a wide variety of identification documents such as passports, driver's licenses, voter ID cards, social security cards, etc. Different countries also have different versions of driver's licenses, passports, and other identification documents such as a permanent account number (PAN) card and an Aadhaar card used in India. Other types of documents may also be associated to a person such as bank statements, bank slips, payroll checks, utility bills, tax documents, and so on.

Identity and financial documents of people are fundamental parts to a variety of organizations for a variety of purposes. For example, banking systems that provide banking services like Customer Onboarding, Credit Card issuing, Loan Approval, etc. begin with an application process that includes identification documents sent by a customer. A company's hiring process typically includes a set of documents being submitted by a prospective employee. The documents can be sent electronically via email, WhatsApp, chat-bots, other types of computer platforms, or in person. In some systems, a person can bulk upload multiple documents simultaneously.

In all these scenarios, prior systems have one thing constant: someone on the receiving end must review each submitted document manually to identify the document types and validate them. This is a time consuming process and prone to error.

In some prior systems, a customer is required to indirectly identify particular documents that are submitted. For example, a website to upload documents may include specific placeholders for specific types of documents such as a placeholder to upload a passport. However, there is no guarantee that the customer actually uploads a passport in the correct location for the passport. Thus, someone on the receiving end must still manually verify the document types that are submitted and verify that all required documents are submitted. This again is extremely time-consuming and is a redundant process.

Some prior systems have attempted to identify documents by identifying readable text from a document using optical character recognition or natural language processing. However, most documents are in unstructured data formats and these systems require large amounts of data to accurately identify a document based on understanding the language and text. Furthermore, some documents have very little readable text that can be used to identify a document, thus resulting in a failed identification. Therefore, a more intelligent system for identifying documents will provide improvements to these processes.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
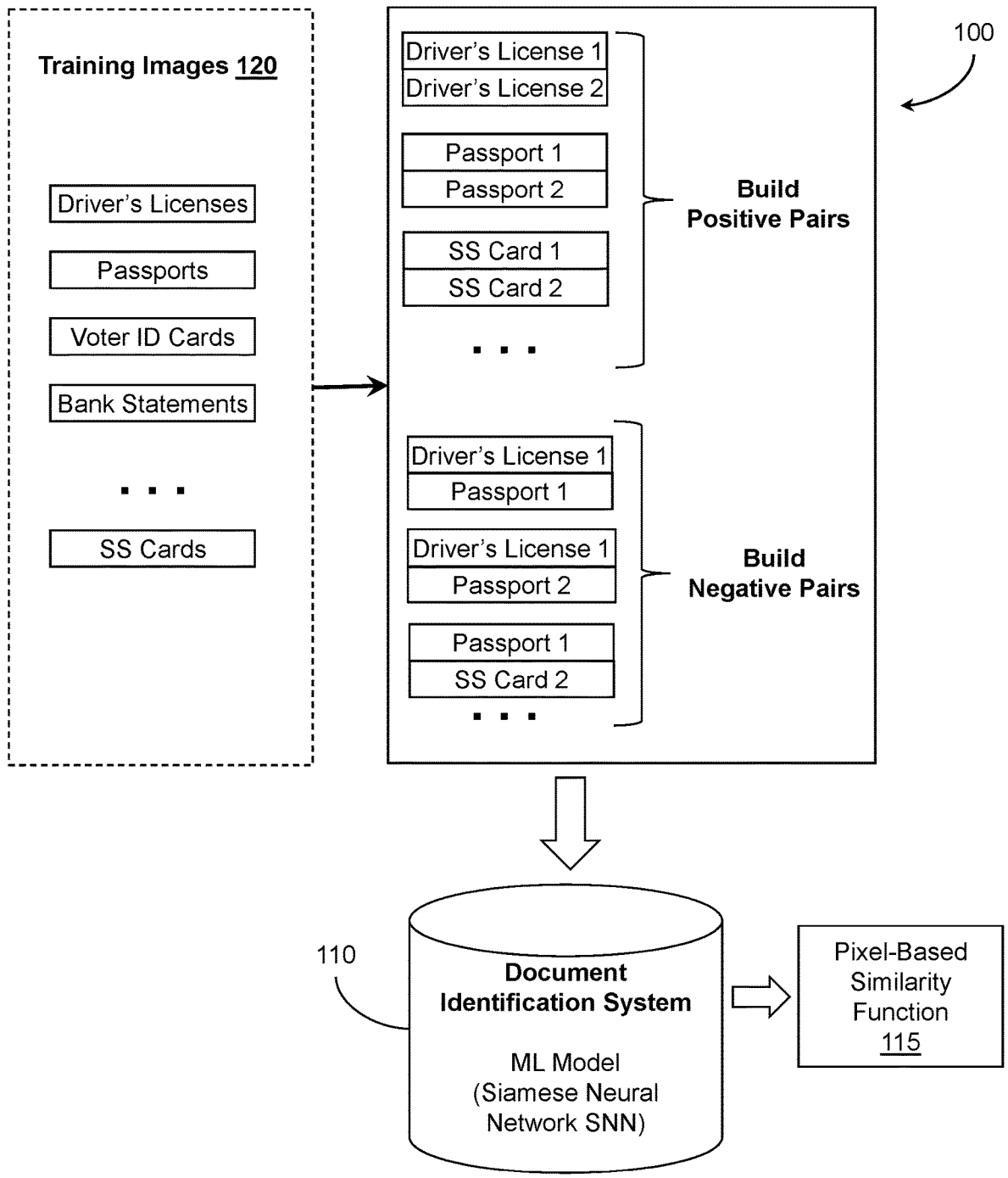
FIG. 1 illustrates one embodiment of system for training a document identification system to identify similar images from a set of training images.

Systems and methods of a document identification system are described herein that provide an intelligent framework for identifying/classifying unknown electronic documents. In one embodiment, a machine learning model is trained to classify unknown documents based on visual image features and visual image similarities to a set of anchor images. Classifying an unknown document is performed without reading or understanding text that may be present in the document. Thus, the present image similarity technique provides an improvement over previous systems since the present system is faster and uses a relatively fixed time to classify a document as compared to using natural language processing techniques that depend on understanding text.

In one embodiment, the present document identification system is configured to identify documents for an application process and verify that a required set of documents have been submitted from a user. Different applications typically have different types of required documents. For example, a loan application, a new customer onboarding application, a new employee application, and so on may require different types and amounts of documents to comply with the application process. The present document identification system is configured to define a set of required document types/classes for an application process. Each document type/class is represented by one or more anchor images that belong to the particular document type/class (e.g., a driver's license, a passport). The present system is trained to learn visual similarities and dissimilarities based on image pairs.

In operation after being trained, the present system may then determine whether a set of submitted documents satisfies the required documents for an application process based on visual image feature classification. In one embodiment, when an unidentified document is passed through the present system, the present system predicts a document type/category with a certain confidence score that reflects the certainty of the prediction. The present system provides additional improvements to prior systems by reducing human intervention and is less prone to error when identifying documents. The present system is also configured to be data agnostic and thus may be re-trained for any different type of image, which is another improvement over natural language processing systems.

Definitions

A "document" as used herein refers to an electronic version of a document that is in an image format. The image format is in a two-dimensional format comprised of pixels (e.g., JPEG, JPG, GIF, PNG). Documents that are in a text format such as a Word document are converted into an image format prior to being processed by the present system. As such, the term "document" and "image" are used interchangeably since an image, as used herein, represents an image of some type of document.

A document "type" or "class" as used herein refers to an identification, classification (class), or category of a document. These terms may be used interchangeably. For example, a driver's license, a passport, a bank statement, and a tax form are each different types/classes/categories of documents. A document type may include different versions of the same type, such as a driver's license from different states or countries may have different image layouts, different image features, different colors, etc. but are still the same "type" of document.

An "anchor image" as used herein includes an image of a document that has been selected to represent a specific type/class of document. At least one anchor image is used for each document type/class that the present system is trained to identify. Multiple anchor images may be used to represent a document type where the document type may have different visual versions or image layouts (e.g., different driver's licenses from different states or countries). Anchor images are used by the present system to determine visual similarities to unknown documents in order to identify the type/class of the unknown document. In general, the anchor images used in the system may vary and may be changed for a particular use case.

The functions of "identifying" or "classifying" a document refer to the present system predicting or determining the "type" of an unknown document, which is based on visual image features and their similarities to anchor images.

Training Phase

With reference to FIG. 1, one embodiment of a training phase 100 is illustrated that is associated with training a document identification system 110 to visually identify documents. During the training phase 100, as explained below, the document identification system 110 (or document ID system 110) learns a pixel-based similarity function 115 that identifies visual similarities and visual dissimilarities between two documents. After being trained, the document identification system 110 is configured to receive an unknown document as input and identify the "type" of the unknown document by applying the similarity function 115 learned from the training phase 100. In one embodiment, when passed through the system 110, the unknown document receives a predicted type/category tagged to the document with a confidence score, which represents the certainty of the prediction.

In one embodiment, the document ID system 110 is configured with a machine learning (ML) model that learns visual representations of documents employing computer vision and image recognition technologies to identify image similarities. In this manner, the ML model does not read any text on a document to categorize it into any type/class. The document ID system 110 looks at documents visually (pixel-based) and tries to find image patterns and hence, representations of those image patterns.

In general, the ML model tries to imitate how humans think and make decisions. When a person receives a passport, they do not need to read through the document to identify that it is a passport. The person will have already seen many passports and the images associated to a passport. Thus, a person can directly say that the document is a passport just by looking at it.

The human brain can learn the patterns of a particular document from historical encounters with that document. Certain documents have unique layouts such as having a picture in one corner, codes written at the bottom, and/or a specific color of the document, etc.

The ML model of the document ID system 110 is configured with similar principles. As an overview, the ML model gets trained by seeing previous visual image data from different document types. The ML model tries to find visual features and image patterns in the documents that separate them from other documents and bring them closer to their document type. The ML model learns mathematical representations of these visual features and saves them. This becomes a memory for the ML model.

The document ID system 110 does not read the text on the documents. Many prior systems use an optical character recognition (OCR) approach where they extract text from a document using OCR engines and work on the text to classify the document. From the extracted text, the OCR system can find patterns or words specific to a passport, and then classify the document as a passport when the words match. In the present document ID system 110, it does not perform text extraction or word recognition, which is a limited approach that requires more computing resources and processing time. Thus, the present system 110 eliminates a time-consuming OCR task and improves the overall process.

As described herein, the present document ID system 110 relies on visual features for identification purposes (e.g., pixel-based analysis). For example, the system 110 tries to find visual features like faces, signatures, lines, colors, codes, object edges, object layouts, visual feature arrangements, etc. based on pixel values and object recognition techniques. In general, the document ID system 110 is configured to learn image layouts rather than understanding text. It has been found through experiments that using visual features and image layouts works better and faster than OCR based identification approaches.

In one embodiment, the present system 110 is configured to be data agnostic and thus is not dependent on a particular set of visual data or documents. Different organizations each may use different application processes. Thus, the types of documents used can change. Furthermore, identification documents are generally unique to a particular country. Thus, the types of documents used to train the present system 110 will change based on its particular use.

In one embodiment, the ML model of the document ID system 110 may be a Siamese Neural Network (SNN), but other types of image similarity analysis models may be used. The Siamese Neural Network (SNN) is used as one example and will be described herein. The concept of the SNN is based on Siamese Twins. The idea is that if two separate images (an image pair) are passed through two twin neural networks, both networks will produce pixel-based visual feature representations of the two images. But since these networks are essentially twins, the visual feature representations of two similar images passed through both of the networks should be similar. So, the SNN tries to learn a pixel-based similarity function 115 to find similarities (and differences) between two visual feature representations that are outputted from comparing two input images.

Whenever two new images are given to the SNN as an input pair, the two images pass through its twin networks to get output feature representations. These feature representations are then compared using the learned similarity function 115 and a similarity score is generated. The value of the similarity score reflects whether the two images are similar or dissimilar based on a value range (e.g., value "1" means exact match and value "0" means completely dissimilar).

For training the system 110, a set of training images are used as described below. For identification after training (during operation of the system 110), the training images are replaced with a set of anchor images. For example, at least one image/document is selected for each document "type" (e.g., a final class of document) and the selected images are stored in the system. These selected images/documents are called anchor images because they visually represent a particular document type. The set of anchor images may be a subset of the training images. As will be described below, during operation of the system 110, rather than sending two documents as input, a customer only needs to send one document. The second document (the paired image) going into the SNN comes from the anchor images already stored in the system. Thus, the pair of images given as input to the SNN is not of two input images. The pair includes one input image (unknown document) and one of the anchor images from the system. This is a new configuration of a SNN, which enables the present system to compare unidentified incoming documents with one document (anchor image) from each final class (document type).

In one embodiment, rather than learning the types or classes of documents, the ML model (SNN) learns a similarity function 115 between documents that is determined from similarities of pixel-based visual image features. Thus, the input to the ML model is not a single document for the purpose of learning what that type of document looks like or what type of document it is. Instead, the input is a pair of two documents to learn similarities between the pair. fIn one embodiment, the SNN takes in two document images (a pair of images), performs convolutions, and calculates visual representations of the two documents separately to generate a visual feature vector for each image. Then, depending on the pair, the SNN learns to find similarities or differences between the two visual representations. When shown many pairs of document images, the SNN learns the similarity function 115 that can tell the similarity or difference between two documents.

Training Example

With continued reference to FIG. 1, the document ID system 110 and its SNN is trained using a set of training images 120. A training image may be similar to an "anchor image" as used herein and includes an image of a document type that has been selected to represent a specific type/class of document. The actual type of a training image is not given to the document ID system 110. The "type" of the training image is not required to be known since the SNN does not learn document types and does not identify document types. The SNN learns image similarities between two images that are paired.

In one embodiment, the set of training images 120 is selected to include some number of images per document type. For example, but not limited thereto, 8 driver's licenses, 4 passports, 6 voter ID cards, etc. Each document type may be stored in a separate folder or directory, and/or tagged with its type to separate the different types/classes of anchor images. For example, a plurality of folders may be defined in a data storage device, wherein each folder contains a similar type of document and where each document is in an image format (e.g., pixel-based image, JPEG, PNG, etc.). The types of training images 120 may be selected by a user who is training the system 110 where the training images 120 are selected based on the types of documents that are desired to be used by the document ID system 110. The types of training images may also be dependent on a particular application process that requires a certain set of documents to complete the application process. In general, the training images 120 used may vary and may be changed for a particular use case. To expand the similarity identification functionality of the system 110, new training images may be added and the training process repeated.

In FIG. 1, a few document "types" of training images 120 are shown as driver's licenses, passports, voter ID cards, bank statements, social security (SS) cards, etc. The present system 110 is not limited to these image types since any type of document may be used. Furthermore, each folder for each type of training image 120 may include multiple training images that represent the document type where the document type may have different visual versions. For example, there may be five or six different training images of driver's licenses that represent five or six most common or most distinct visual formats from five or six different state driver's licenses. Different countries have different document types, which may also be used as training images. For example, India uses identity documents such as an Aadhar card, permanent account number (PAN) card, Persons of Indian Origin Card (PIO Card), and so on.

To train the document ID system 110 to identify similarities and differences between images, pairs of training images/documents are created. When pairing the training images/documents 120, two types of pairs are created: positive pairs and negative pairs. Positive pairs are two similar documents where both documents in a pair are from a single document type/class (e.g., the same type of document). For example, the training process builds positive pairs of driver's licenses, pairs of passports, pairs of voter ID cards, pairs of Social Security cards, etc. The image pairs are not duplicate copies of each other but two different images that have the same document type. Since both images in a positive pair are from the same document type/class, they are more visually similar than dissimilar to various degrees although not necessarily exactly the same. Thus, a positive pair including driver's license 1 and driver's license 2 (both taken from the image type/class of driver's licenses), are two different driver's licenses but should have a higher degree of similarity than two different types of images (e.g., driver's license 1 and a passport).

The training process also builds negative pairs of dissimilar documents where each negative pair includes a training image/document 120 from different types/classes (e.g., two different types of documents). For example, the system retrieves one training image 120 from two different image folders to create negative pairs, such as driver's license-passport pairs, passport-SS card pairs, and multiple other negative pairs. Since the two images in a negative pair are from different types/classes, they should be more visually dissimilar than similar.

The positive pairs and negative pairs are fed into the system to train the ML model (SNN) to find visual similarities between the documents in the positive pairs and to find visual differences between the documents in the negative pairs. In one embodiment, this may be performed by extracting visual features from each image using pixel analysis. For example, based on analysis of pixel values, the ML model identifies visual features such as objects, arrangement/locations of objects, size of objects, lines, colors, boundaries, edges, logos, blank space, etc. that may be present in an image.

In one embodiment, the visual features of each image are extracted into a 2-dimensional matrix of features. The 2-dimensional matrix is then transformed into a one-dimensional vector/array of values that represent the extracted visual features. This is performed for both images in the pair being analyzed. Then the ML model compares the one-dimensional feature vectors from each image in the pair to determine similarities and generates a similarity score.

In one embodiment, comparing the one-dimensional feature vectors of the image pair may involve measuring a distance between the vectors using a distance function. When the distance is small, then the feature vectors are similar, which results in a higher similarity score. When the distance is larger, then the feature vectors are not similar, which results in a lower similarity score. In one embodiment, the similarity score may range from 0 (completely different images) to 1 (exact matching images). Various distance functions may be used with the present system as well as various different feature vector comparison techniques, which are understood by those of ordinary skill in the art. Thus, these are not described in further detail.

In the training phase, the system 110 and ML model learns a similarity function 115 based on the positive and negative image pairs, rather than learning actual image types/classes. For example, the training phase includes inputting the positive pairs to the Siamese neural network to learn the similarity function 115 between the similar documents based on visual features of the similar documents, and inputting the negative pairs to the Siamese neural network to learn dissimilarities between the dissimilar documents based on the visual features of the dissimilar documents. The Siamese neural network then generates a similarity score after comparing two documents based at least on the similarity function as applied to the two documents.

In one embodiment, the system 110 does not learn to predict a final document type/class of an unknown document. The system 110 rather learns to calculate the similarity between two given documents. In this manner, the present system 110 transforms a classification problem into a similarity finding problem, which has certain advantages particular to some use cases.

For example, in one use case, suppose a company has an application process that requires a "Driver's License" as a required document. However, the driver's licenses of every state may have a different visual pattern (e.g., 50 different versions). This might cause a typical classification model to incorrectly predict the type of an unknown document. But in the present system, this scenario is accounted for since the system 110 is not trained to learn the final class of a document but rather learns similarity between an input document and the anchor images. Furthermore, rather than having one anchor image for a driver's license, multiple different anchor images of driver's licenses from different states can be stored in the anchor image folder having the type "driver's license." Then, the input document will be compared with multiple varieties of anchor driver's licenses before making a prediction. Anchor images are explained in detail later on.

In another use case, most documents used by banks or hospitals are confidential. Hence, prior classification systems cannot be properly trained with a large number of documents because the confidential documents are not permitted to be used. However, with the present similarity technique, the document ID system 110 is not trained to identify the final class of a document, and thus, requires much fewer documents to train the system to learn the similarity function 115, which is an improvement over prior systems.

Once the document ID system 110 is trained from the training images 120 and has learned the similarity function 115, the document ID system 110 may be used to identify unknown documents. As will be described below, during operation, a set of anchor images are selected to represent different document types. The anchor images are used for similarity analysis with unknown documents. The set of anchor images may be a subset of the training images 120 that are used. In general, a fewer number of anchor images can be used during operation as compared to the number of training images 120 used for training purposes.

Visual Representations of Text-Rich Documents

In one embodiment, text-rich documents used as training images or anchor images may be pre-processed in one or more ways to help the present system extract informative visual features other than text. For some background, when using computer vision, most ML models work on visually image-rich documents. For example, a face-comparison engine works on images of faces. Image-rich documents, like a passport or driver's license, are generally very specific. The present system 110 also uses image-rich documents as training images and/or anchor images for various use cases that contain a lot of information in them like faces, signatures, text, logos, colors, codes, etc.

However, the present system 100 also uses document types that may be extremely text-rich documents that do not have many images, if any. Text-rich documents include bank statements, tax forms, income tax returns (ITR), salary statements, or other financial-based documents.

Most of the information present in these text-rich documents comes from text only since there are few actual images in the documents. For example, in an income tax return (ITR), there may be zero images. In bank statements, the images may include a bank's logo and no other images. But for the most part, these documents only contain text and data tables.

Since the present system 110 learns visual representations of documents, the visual representations of these text-rich documents will reflect that the documents have a huge amount of text. This may cause a problem for differentiating text-rich documents from each other based on image features.

Thus, in one embodiment, when using such text-rich documents as training images or anchor images, some preprocessing techniques may be performed to help the ML model extract informative features rather than just text to identify the differences. For example, one such technique is cropping the whole image into smaller parts and using the most visual part (non-text parts) for similarity identification purposes. For example, humans can tell a bank statement apart from an ITR form just by looking at the top of both documents. We don't need to see the whole document to know that a document is an ITR form. This means that visually differentiating information about such documents can be found in smaller parts of the document. Thus, the present system may leverage this technique in a preprocessing phase of the system when using a text-rich document as a training image or an anchor image.

Accordingly, pixel-based ML models which are mainly equipped to learn image features in image-rich documents may also be used in the present system to learn image features for text-rich documents as well.

Predicting a Document Type for an Unidentified Document

Figure 2:
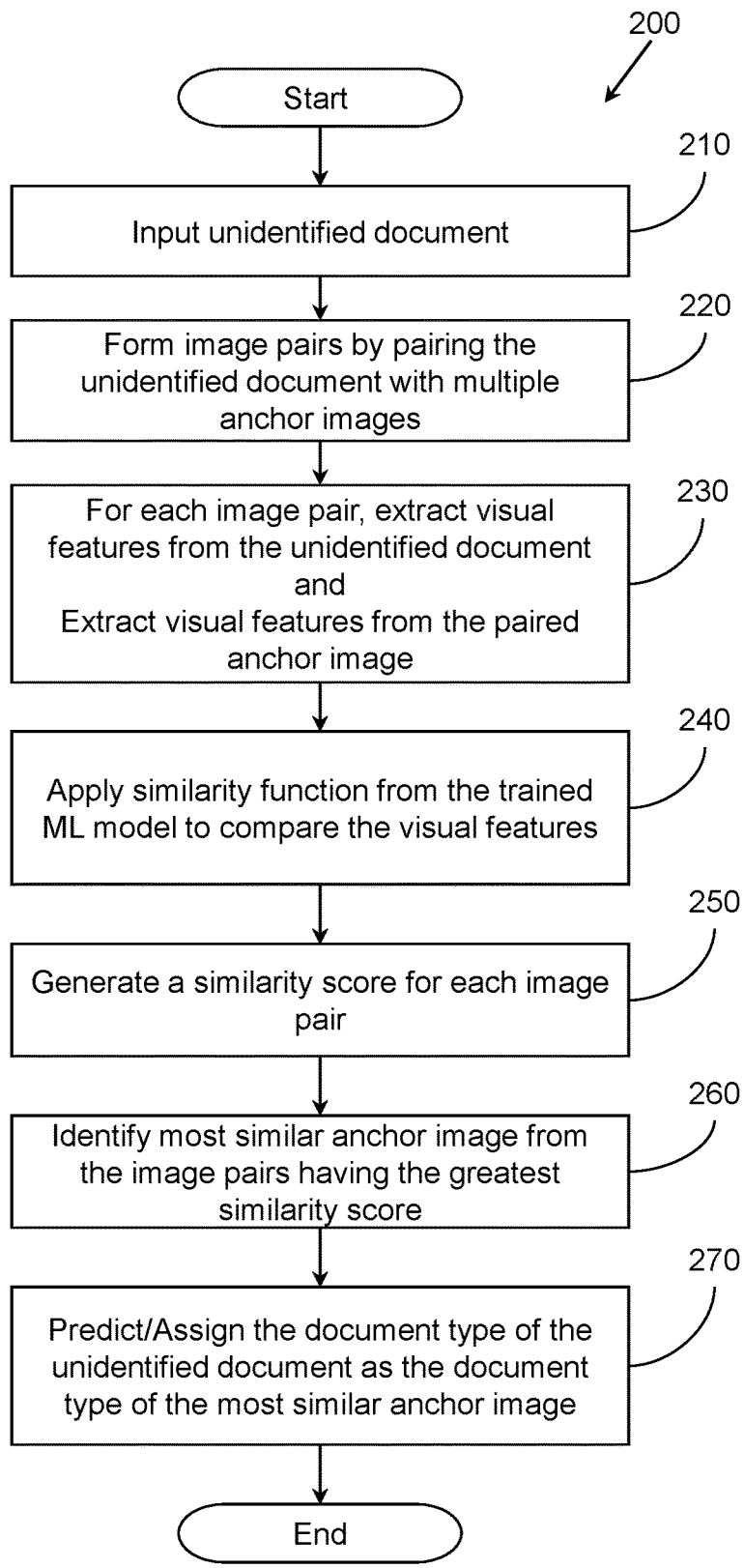
FIG. 2 illustrates one embodiment of a method that is associated with identifying a document type of an unidentified document using the trained document ID system.
Figure 3:
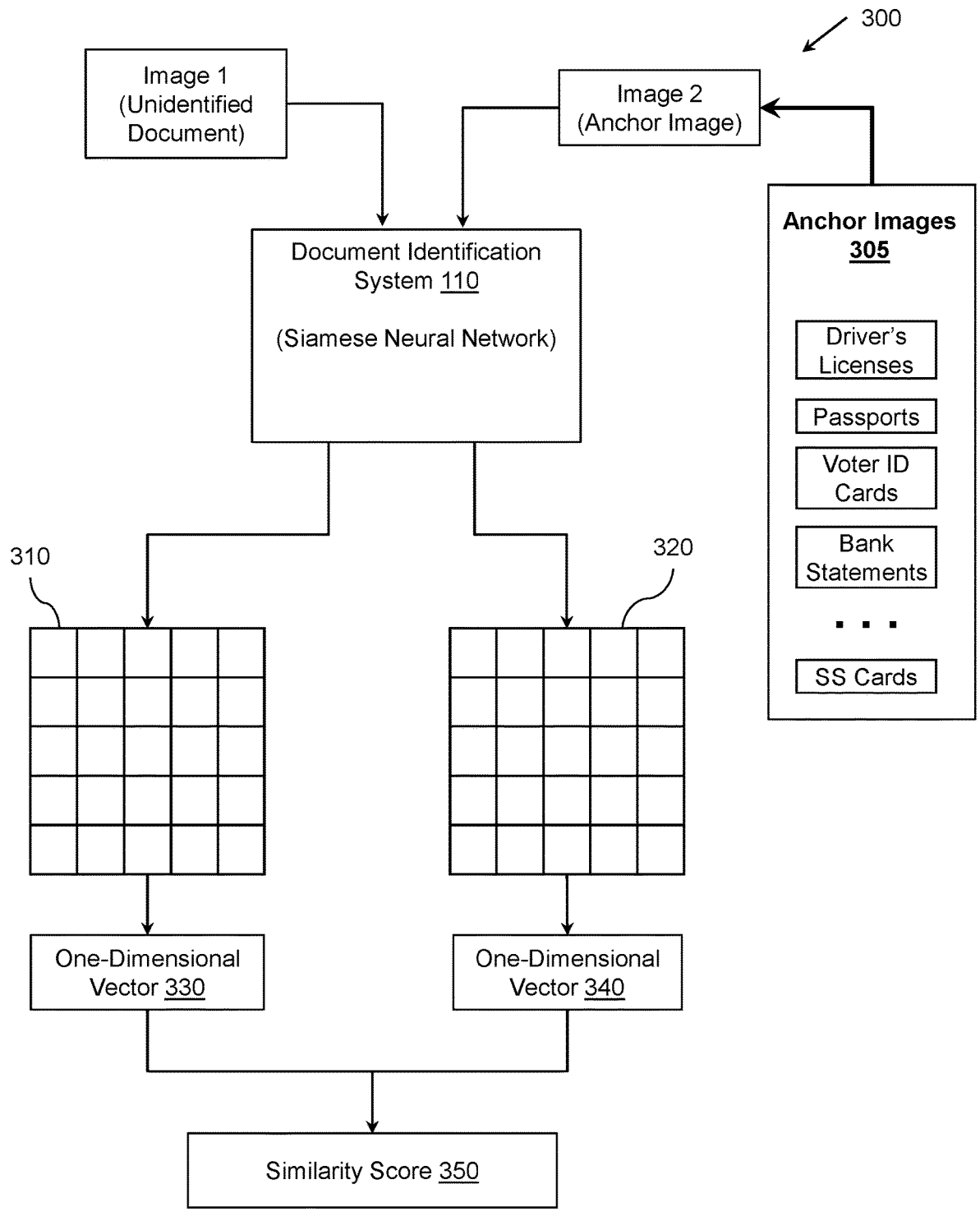
FIG. 3 illustrates one embodiment of components of the method of FIG. 2 and an image comparison process.
Figure 4:
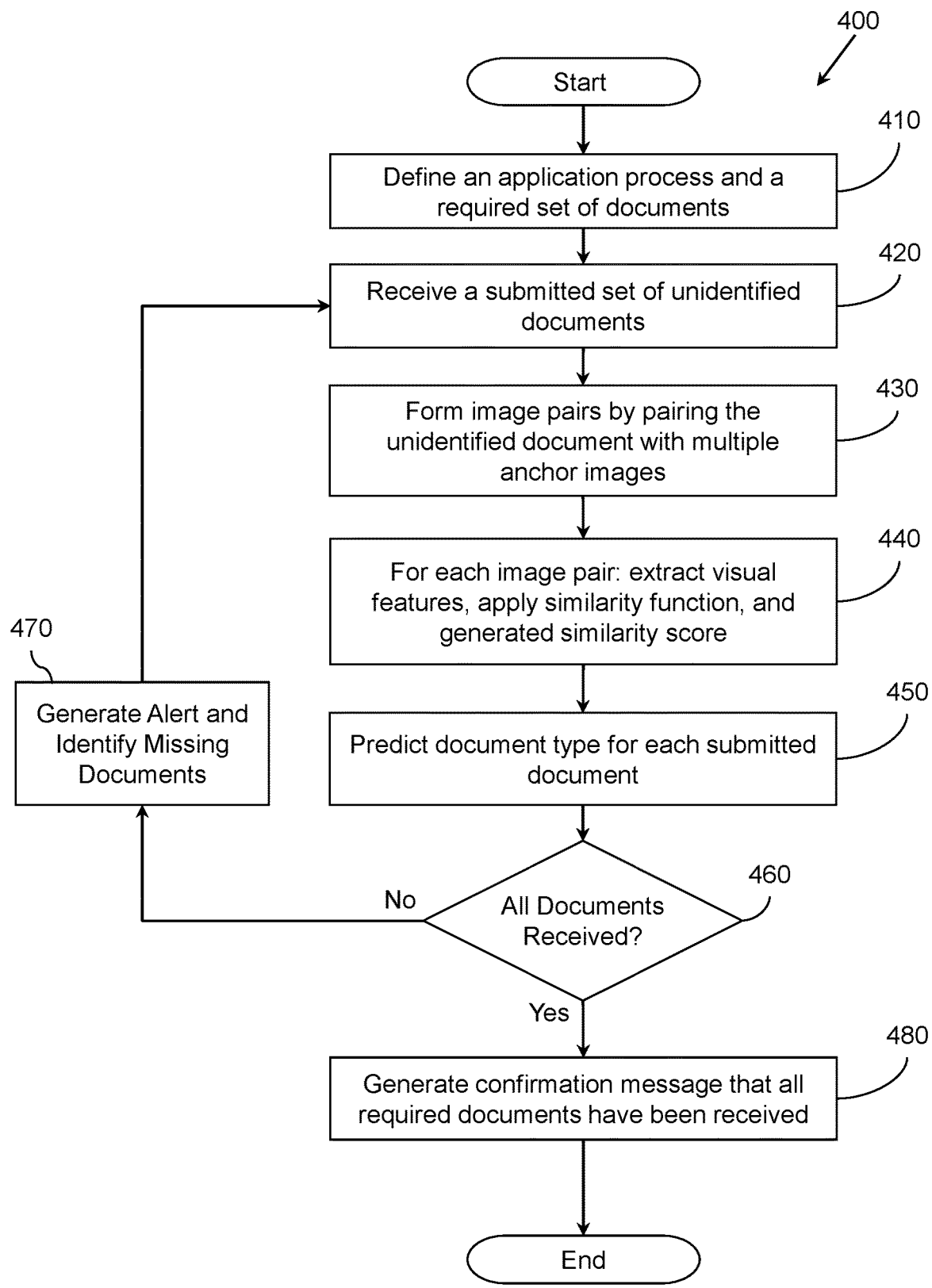
FIG. 4 illustrates another embodiment of the document ID system configured to identify documents as part of an application process.

With reference to FIG. 2, one embodiment of a method 200 is illustrated that is associated with identifying a document type of an unidentified document using the trained document ID system 110. FIG. 3 illustrates one embodiment of components of method 200 and an image comparison process. FIG. 4 illustrates another embodiment the document ID system 110 configured to identify documents as part of an application process, which is discussed below.

During operation of the document ID system 110, the training images are replaced with a set of anchor images 305 (shown in FIG. 3). The anchor images 305 are used for similarity analysis with an unknown document(s) that is being identified.

A general overview of FIG. 2 and method 200 is as follows. When a new unidentified document is received for prediction, the system pairs the unidentified document with each of the anchor images. The image pairs are sent one by one to the trained document ID system 110 (e.g., the trained Siamese neural network (SNN)). Since the SNN is trained to calculate the similarity between two documents/images, the SNN generates similarity scores for each pair of images, which include the unidentified document paired with an anchor image. Then, the system finds the most similar image pair that has the highest similarity score. The document type of the anchor image in the most similar image pair becomes the predicted final document type/class of the unidentified document. Thus, the unidentified document is identified.

In particular, with reference FIG. 2, the method 200 for identifying a document based on visual similarities begins at block 210 by inputting an unidentified document to the trained document ID system 110. Recall that the document ID system 110 is trained with a set of training image types 120 (FIG. 1) where each image type may include one or more images of the same image type. During operation, the training images are replaced with the set of anchor images 305 (FIG. 3) and similar principles apply. For example, a passport (which is one type/class of document) may have two anchor images representing two different versions of passports.

At block 220, document ID system 110 forms image pairs by pairing the unidentified document with multiple anchor images 305 (FIG. 3) that are contained in the system. As previously stated, each anchor image is a known document type from a plurality of known document types. For example, the anchor images 305 are retrieved and paired with the unidentified document to create image pairs: unidentified document+anchor image 1; unidentified document+anchor image 2; unidentified document+anchor image 3, etc.

The method 200 will also be described with reference to FIG. 3 that illustrates example components 300 that are part of the method 200, in one embodiment. With reference to FIG. 3, a pair of images is inputted to the document ID system 110 where image 1 is the unidentified document and image 2 in the pair is one of the anchor images 305 selected from the different image types. The system will ultimately pair the unidentified document with each of the anchor images 305.

At block 230, for each image pair, the ID system 110 extracts visual features from the unidentified document and likewise extracts visual features from the paired anchor image. As previously explained, the visual features are extracted based on pixel-based data and pixel analysis of the images to identify the visual features in the document. Also, since the visual features are extracted based on pixel data, the extracting is performed without reading text from the unidentified document.

In one embodiment, a matrix of visual features 310 (FIG. 3) is generated for the extracted visual features from the unidentified image and a matrix of visual features 320 is generated for the extracted visual features from the paired anchor image. Each matrix of visual features may then be transformed into a one-dimension feature vector 330 and a one-dimension feature vector 340 of values that represent the extracted visual features from the pair images, respectively.

In another embodiment, the one-dimensional feature vector for each anchor image may be previously generated and stored. In this manner, computational processing is reduced by not having to extract visual features and generated feature vectors for the anchor images for every inputted unidentified document. Rather, once the one-dimensional feature vector is generated for the unidentified document, its one-dimensional feature vector is paired with the pre-generated one-dimensional feature vectors of the anchor images and submitted to the similarity function in block 240.

At block 240 (FIG. 2), the similarity function that was learned during the training phase is applied to compare the visual features of the unidentified document and the visual features of the paired anchor image. In the embodiment of FIG. 3, this may include comparing the one-dimensional feature vector 330 (from the unidentified document) and the one-dimensional feature vector 340 (from the paired anchor image) to each other to measure distances between their values, as previously explained. When the distances between the vector values are smaller, then the images are more similar. When the distances between the vector values are larger, then the images are more different.

The learned similarity function of the ML model (SNN) is applied to the feature vectors. The visual feature extraction and comparison is performed for each image pair in a sequential process or simultaneously.

At block 250, a similarity score is generated for each image pair based on applying the similarity function and the comparison results of the feature vectors. As previously stated, the similarity score may range from value 0 (completely different images) to value 1 (exact matching images). A higher similarity score (closer to "1") is generated when the two images are more similar and a lower score (closer to "0") is generated when the two images are different. In one embodiment, a minimum threshold score such as value "0.5" may be assigned in order to consider two images as being similar. As similarity scores drop from "1" to "0.5", the confidence of the images being similar also drops.

At block 260, the system predicts the most likely document type of the unidentified document. The most similar anchor image is identified from the image pairs that has the greatest/highest similarity score from all the similarity scores. After analyzing each image pair, the system has compared the unidentified document to each of the anchor images. Each image pair has an assigned similarity score, and the highest similarity score is determined from all the scores.

At block 270, the document type of the unidentified document is predicted and assigned as the known document type associated with the most similar anchor image.

The image pair (e.g., unidentified document+anchor image X) with the highest similarity score identifies the most similar anchor image to the unidentified document, namely, anchor image X. Thus, the system predicts/identifies the document "type" or "class" of the unidentified document as being the same "type" or "class" as anchor image X. If anchor image X is the document type "passport," then the unidentified image is determined to be a passport. If anchor image X is the document type "bank statement," then the unidentified image is determined to be a bank statement. The prediction may also include tagging the unidentified document with a category tag that identifies the unidentified document as the known document type associated with the most similar anchor image.

In one embodiment, the system knows the document type of the anchor images from the anchor image folders they are contained in. As described with reference to FIG. 1, each document type is separated by folders, where each folder contains anchor images of a single type (e.g., folder for driver's licenses, folder for passports, etc.). In another embodiment, each anchor image may be labeled with their document type, which allows the system to determine its type.

In one embodiment, a confidence score may also be calculated to reflect how confident the system is in the similarity score and the predicted document type of the unidentified document. The confidence score may be based on how close the similarity score is to a perfect value of "1", the closer to 1 gives a higher confidence score. In another example, the confidence score may be affected by finding another high similarity score, for example, where the second highest similarity score from the image pairs belongs to a different anchor image type. This may mean that the unidentified document could be one of two different types.

In another embodiment, when the system calculates the similarity scores for the unidentified document with every anchor image, it checks if any of the scores are greater than the defined similarity threshold or not (e.g., greater than 0.5). If all the similarity scores are less than the threshold, it means the document ID system 110 (SNN) is not confident that the unidentified document is any of the anchor image types. This may occur with text-rich documents like bank statements and salary statements. These text-rich documents can have thousands of different patterns depending on the company that issues them. In such cases, the system 110 may produce low similarity scores for all the anchor images.

In such a scenario, the unidentified document may be sent to a different pipeline using optical character recognition (OCR) to extract text out of the image document. This text is then compared with some pre-written regular expressions to find the type of the unidentified document.

Application Process Embodiment with Document Identification

With reference to FIG. 4, one embodiment of a method 400 is illustrated where the document ID system 110 may be configured to verify an application process by using the similarity identification method 200. For example, the system 110 may identify and verify whether a set of submitted documents, which are unidentified when received, satisfy required documents for an application process or whether certain documents are missing.

The application process may include any process that requires certain types of documents and/or certain numbers of documents to comply with the application process. For example, an application process may be for obtaining a mortgage or other loan, adding a new customer/client account, purchasing a home or car, applying for a credit card, filing a tax return, and so on. Each of these application processes require certain types of documents to be submitted, which are different for each application.

Typically, users/customers that submit documents do not tag the documents with their document types like driver's license, passport, etc. Sometimes the documents are tagged with the wrong document type. Furthermore, users/customer frequently submit incorrect documents or less than the required number of copies. Prior to the present system, an employee on the receiving end was required to go through every submitted document to verify its type and communicate back to the user/customer. And there was still a chance that the user/customer again omitted required documents a second time. This was an extremely time-consuming and redundant process. The present document ID system 110 provides for intelligently identifying submitted documents to reduce or eliminate such issues.

At block 410, the application process is first defined with a required set of requested documents. For example, a required set of documents for an application process may be defined to include three document types: a driver's license, a bank statement, and a paycheck. This may be performed by a user interface configured to allow for the selection of a variety of available document types and associating the selected document types (the required documents) with the application process.

At block 420, when the system receives a submitted set of electronic documents from a user/customer to be applied to the application process, the submitted documents are unidentified documents, meaning that their document "type" is not known or is unverified.

At blocks 430, 440, and 450, the document ID system 110 identifies a document type for each of the submitted set of electronic documents by performing the identification method 200 based on visual similarities. For example, at block 430, for each submitted unidentified document, using each of the unidentified documents to form image pairs with each of the anchor images, wherein each anchor image has an assigned document type. As previously described, the anchor images represent different document types and the document ID system 110 was trained to learn a similarity function based on image pairs.

At block 440, the system applies the similarity function to each image pair based on visual features extracted from the image pairs and determines a similarity score for each image pair. For example, this step includes performing the pixel-based visual feature extraction and comparison as in blocks 230 and 240 from FIG. 2.

At block 450, the system predicts/assigns a document type to each submitted document based at least on the most similar anchor image having the greatest similarity score. For example, this includes the functions performed as in blocks 260 and 270 from FIG. 2.

At block 460, based on the document type predicted for each electronic document from the submitted set of electronic documents, the system 110 determines whether the submitted documents include each of the required set of requested documents for the defined application process. For example, each of the predicted document types (from the submitted documents) are matched and compared to the required documents for the defined application process. In the above example, the system 110 determines whether the submitted documents include a driver's license, a bank statement, and a paycheck based on the predicted document types. When one or more documents are found to be missing, the method moves to block 470.

At block 470, in response to the submitted electronic documents not including one or more required documents from the set of requested documents, the system 110 generates an alert message that indicates which documents are missing. The alert message may then be displayed and/or transmitted back to the user that submitted the documents. The system 110 may further keep track of which documents were received and which documents are still required to be submitted, using for example, a data structure or record associated with the user/customer. This may be tracked for each customer involved in the application process. The method may further request that the missing document type be submitted, and flow returns to block 420 when a new document is submitted.

Returning to block 460, when the system 110 determines that the submitted documents include all the required documents for the defined application process, the system 110 may generate and display a confirmation message that confirms all required documents have been received for the specified user (block 480). The method may then continue to the next action for the application process.

Cloud or Enterprise Embodiments

In one embodiment, the document ID system 110 is implemented in a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the document ID system 110 is part of a centralized server-side application that provides at least the functions disclosed herein and that is accessed by many users via computing devices/terminals communicating with the computing system (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 5:
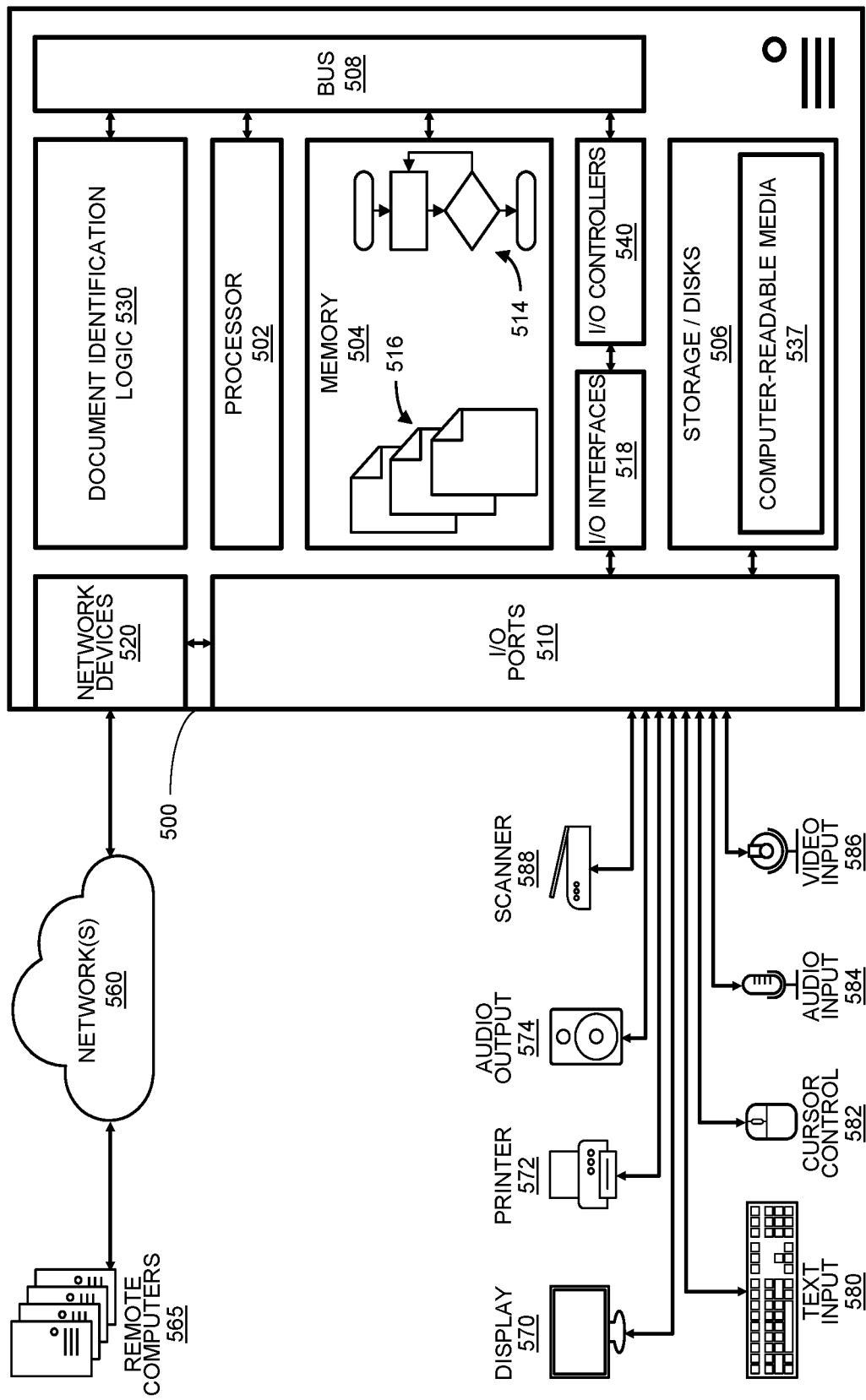
FIG. 5 illustrates an embodiment of a computing system configured with the example systems and/or methods disclosed.

FIG. 5 illustrates an example computing device that is configured and/or programmed as a special purpose computing device with one or more of the example systems and methods described herein, and/or equivalents. The example computing device may be a computer 500 that includes at least one hardware processor 502, a memory 504, and input/output ports 510 operably connected by a bus 508. In one example, the computer 500 may include document identification logic 530 configured to facilitate document identification similar to document identification system 110 shown in FIGS. 1-4.

In different examples, the logic 530 may be implemented in hardware, a non-transitory computer-readable medium 537 with stored instructions, firmware, and/or combinations thereof. While the logic 530 is illustrated as a hardware component attached to the bus 508, it is to be appreciated that in other embodiments, the logic 530 could be implemented in the processor 502, stored in memory 504, or stored in disk 506.

In one embodiment, logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate document identification based on image similarities. The means may also be implemented as stored computer executable instructions that are presented to computer 500 as data 516 that are temporarily stored in memory 504 and then executed by processor 502.

Logic 530 may also provide means (e.g., hardware, non-transitory computer-readable medium that stores executable instructions, firmware) for performing document identification.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output (I/O) interface (e.g., card, device) 518 and an input/output port 510 that are controlled by at least an input/output (I/O) controller 540. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with, control, and/or be controlled by input/output (I/O) devices via the input/output (I/O) controller 540, the I/O interfaces 518, and the input/output ports 510. Input/output devices may include, for example, one or more displays 570, printers 572 (such as inkjet, laser, or 3D printers), audio output devices 574 (such as speakers or headphones), text input devices 580 (such as keyboards), cursor control devices 582 for pointing and selection inputs (such as mice, trackballs, touch screens, joysticks, pointing sticks, electronic styluses, electronic pen tablets), audio input devices 584 (such as microphones or external audio players), video input devices 586 (such as video and still cameras, or external video players), image scanners 588, video cards (not shown), disks 506, network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network 560. Through the network, the computer 500 may be logically connected to remote computers 565. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method performed by a computing system for identifying a document type of an unidentified document, the method comprising:
   forming image pairs by pairing the unidentified document with anchor images from a plurality of anchor images, wherein each anchor image is a known document type from a plurality of known document types;
   for each image pair, extracting first visual features from the unidentified document and extracting second visual features from the paired anchor image;
   applying a similarity function to compare the first visual features and the second visual features;
   generating a similarity score for each image pair based on the comparing;
   identifying a most similar anchor image from the image pairs having a greatest similarity score; and
   predicting the document type of the unidentified document as the known document type associated with the most similar anchor image.

2. The method of claim 1, further comprising:
   defining an application process to require a set of requested documents;
   receiving a submitted set of electronic documents that are unidentified documents to be applied to the application process, wherein the unidentified document is one of the submitted set of electronic documents;
   identifying each of the submitted set of electronic documents by (i) forming image pairs with each of the plurality of anchor images, (ii) determining similarity scores for each image pair, and (iii) assigning a document type to each electronic document based at least on the most similar anchor image having the greatest similarity score;
   based on the document type assigned to each electronic document from the submitted set of electronic documents, determining whether the submitted set of electronic documents include each of the set of requested documents; and
   in response to the submitted set of electronic documents not including one or more documents from the set of requested documents, generating an alert message that indicates the one or more documents are missing.

3. The method of claim 1, wherein extracting the first visual features and the second visual features includes extracting pixel-based data and identifying visual features including at least objects, colors, and image patterns.

4. The method of claim 1, wherein extracting the first visual features and the second visual features is performed by a Siamese neural network trained to identify visual similarities between images;
   wherein the method further comprises:
   generating, by the Siamese neural network, a first matrix of the first visual features and a second matrix of the second visual features;
   transforming the first matrix into a first one-dimensional vector and transforming the second matrix into a second one-dimensional vector; and
   wherein comparing the first visual features and the second visual features includes applying the similarity function to compare the first one-dimensional vector to the second one-dimensional vector and generating the similarity score.

5. The method of claim 1, wherein extracting the first visual features from the unidentified document is performed without reading text from the unidentified document.

6. The method of claim 1, further comprising:
   training a Siamese neural network to learn the similarity function between image pairs, wherein the similarity function is based on pixel analysis of the image pairs; and
   wherein the image pairs are inputted to the Siamese neural network and wherein the extracting and comparing are performed by the Siamese neural network to identify the unidentified document.

7. The method of claim 1, further comprising:
   training a Siamese neural network to learn the similarity function between image pairs by:
   defining a plurality of folders, wherein each folder contains a similar type of document in an image format, wherein the similar type of document is different for each folder;
   creating positive pairs of similar documents that include two documents having the similar type from the same folder from the plurality of folders;
   creating negative pairs of dissimilar documents that include two documents each from a different folder from the plurality of folders;
   inputting the positive pairs to the Siamese neural network to learn the similarity function between the similar documents based on visual features of the similar documents;
   inputting the negative pairs to the Siamese neural network to learn dissimilarities between the dissimilar documents based on the visual features of the dissimilar documents; and
   configuring the Siamese neural network to generate a similarity score when comparing two documents based at least on the similarity function as applied to the two documents.

8. A non-transitory computer-readable medium that includes stored thereon computer-executable instructions that when executed by at least a processor of a computer cause the computer to identify a document type of an unidentified document by at least:
   forming image pairs by pairing the unidentified document with each anchor image from a plurality of anchor images, wherein each anchor image is a known document type from a plurality of known document types;
   for each image pair, extracting first visual features from the unidentified document and extracting second visual features from the paired anchor image;
   applying a similarity function to compare the first visual features and the second visual features;
   generating a similarity score for each image pair based on the comparing;
   identifying a most similar anchor image from the image pairs having a greatest similarity score; and
   tagging the unidentified document with a category tag that identifies the unidentified document as the known document type associated with the most similar anchor image.

9. The non-transitory computer-readable medium of claim 8, further comprising instructions that when executed by at least the processor cause the processor to:

define an application process to require a set of requested documents;

receive a submitted set of electronic documents that are unidentified documents to be applied to the application process, wherein the unidentified document is one of the submitted set of electronic documents;

identify each of the submitted set of electronic documents by (i) forming image pairs with each of the plurality of anchor images, (ii) determining similarity scores for each image pair, and (iii) assigning a document type to each electronic document based at least on the most similar anchor image having the greatest similarity score;

based on the document type assigned to each electronic document from the submitted set of electronic documents, determine whether the submitted set of electronic documents include each of the set of requested documents; and in response to the submitted set of electronic documents not including one or more documents from the set of requested documents, generate an alert message that indicates the one or more documents are missing.

10. The non-transitory computer-readable medium of claim 8, wherein the instructions for extracting the first visual features and the second visual features further comprise instructions that when executed by at least the processor cause the processor to:

extract pixel-based data and identify visual features including at least objects, colors, and image patterns.

11. The non-transitory computer-readable medium of claim 8, wherein the instructions for extracting the first visual features and the second visual features are performed by a Siamese neural network trained to identify visual similarities between images;

wherein applying the similarity function further comprises:

generating, by the Siamese neural network, a first matrix of the first visual features and a second matrix of the second visual features;

transforming the first matrix into a first one-dimensional vector and transforming the second matrix into a second one-dimensional vector; and comparing the first one-dimensional vector to the second one-dimensional vector based at least on the similarity function to generate the similarity score.

12. The non-transitory computer-readable medium of claim 8, wherein extracting the first visual features from the unidentified document is performed without reading text from the unidentified document.

13. The non-transitory computer-readable medium of claim 8, further comprising instructions that when executed by at least the processor cause the processor to:

train a Siamese neural network to learn the similarity function between image pairs, wherein the similarity function is based on pixel analysis of the image pairs; and wherein the image pairs are inputted to the Siamese neural network and wherein the extracting and comparing are performed by the Siamese neural network to identify the unidentified document.

14. The non-transitory computer-readable medium of claim 8, further comprising instructions that when executed by at least the processor cause the processor to:

train a Siamese neural network to learn the similarity function between image pairs by:

defining a plurality of folders, wherein each folder contains a similar type of document in an image format, wherein the similar type of document is different for each folder;

creating positive pairs of similar documents that include two documents having the similar type from the same folder from the plurality of folders;

creating negative pairs of dissimilar documents that include two documents each from a different folder from the plurality of folders;

inputting the positive pairs to the Siamese neural network to learn the similarity function between the similar documents based on visual features of the similar documents;

inputting the negative pairs to the Siamese neural network to learn dissimilarities between the dissimilar documents based on the visual features of the dissimilar documents; and configuring the Siamese neural network to generate a similarity score when comparing two documents based at least on the similarity function as applied to the two documents.

15. A computing system, comprising:

at least one processor connected to at least one memory;

a non-transitory computer readable medium including instructions stored thereon that when executed by at least the processor cause the processor to:

define an application process to require a set of requested documents;

receive a submitted set of electronic documents that are unidentified documents to be applied to the application process;

identify a document type for each of the unidentified documents by:

(i) using each of the unidentified documents to form image pairs with each of a plurality of anchor images, wherein each anchor image has an assigned document type;

(ii) applying a similarity function to each image pair based on visual features, and determining a similarity score for each image pair, and (iii) assigning a document type to each electronic document based at least on a most similar anchor image having the greatest similarity score;

based on the document type assigned to each electronic document from the submitted set of electronic documents, determining whether the submitted set of electronic documents include each of the set of requested documents; and in response the submitted set of electronic documents not including one or more documents from the set of requested documents, generating an alert message that indicates the one or more documents are missing.

16. The computing system of claim 15, wherein the instructions to apply the similarity function further include instructions that when executed by at least the processor cause the processor to:

for an image pair including an unidentified document and an anchor image, extract first visual features from the unidentified document and extract second visual features from the anchor image; and wherein the extracted first visual features and the second visual features are pixel-based data for identifying at least objects, colors, and image patterns.

17. The computing system of claim 15, further comprising:

a plurality of folders, wherein each folder contains a single type of anchor image, wherein the single type of anchor image is different for each folder.

18. The computing system of claim 15, further comprising a machine learning model configured to identify the document type for each of the unidentified documents;
  wherein the machine learning model is trained to learn the similarity function between image pairs by:
  inputting a plurality of training images that represent a plurality of document types;
  creating positive pairs of similar training images that include two training images having a same document type;
  creating negative pairs of dissimilar training images that include two training images having different document types;
  inputting the positive pairs to the machine learning model to learn the similarity function between the similar training images based on visual features of the similar training images;
  inputting the negative pairs to the machine learning model to learn dissimilarities between the dissimilar training images based on the visual features of the dissimilar training images; and
  configuring the machine learning model to generate a similarity score when comparing two images based at least on the similarity function as applied to the two images.

19. The computing system of claim 15, further comprising a Siamese neural network trained to learn the similarity function between image pairs, wherein the similarity function is based on pixel analysis of image pairs;
  wherein the Siamese neural network is configured to receive the image pairs of one unidentified document and one anchor image and configured to identify the document type for each of the unidentified documents by applying the similarity function.

20. The computing system of claim 15, wherein the system is configured to identify the document type for each of the unidentified documents without reading text from the unidentified document.

* * * * *